(No Model.)
A. A. WHITELY.
EXERCISING APPARATUS.
No. 557,176. Patented Mar. 31, 1896.
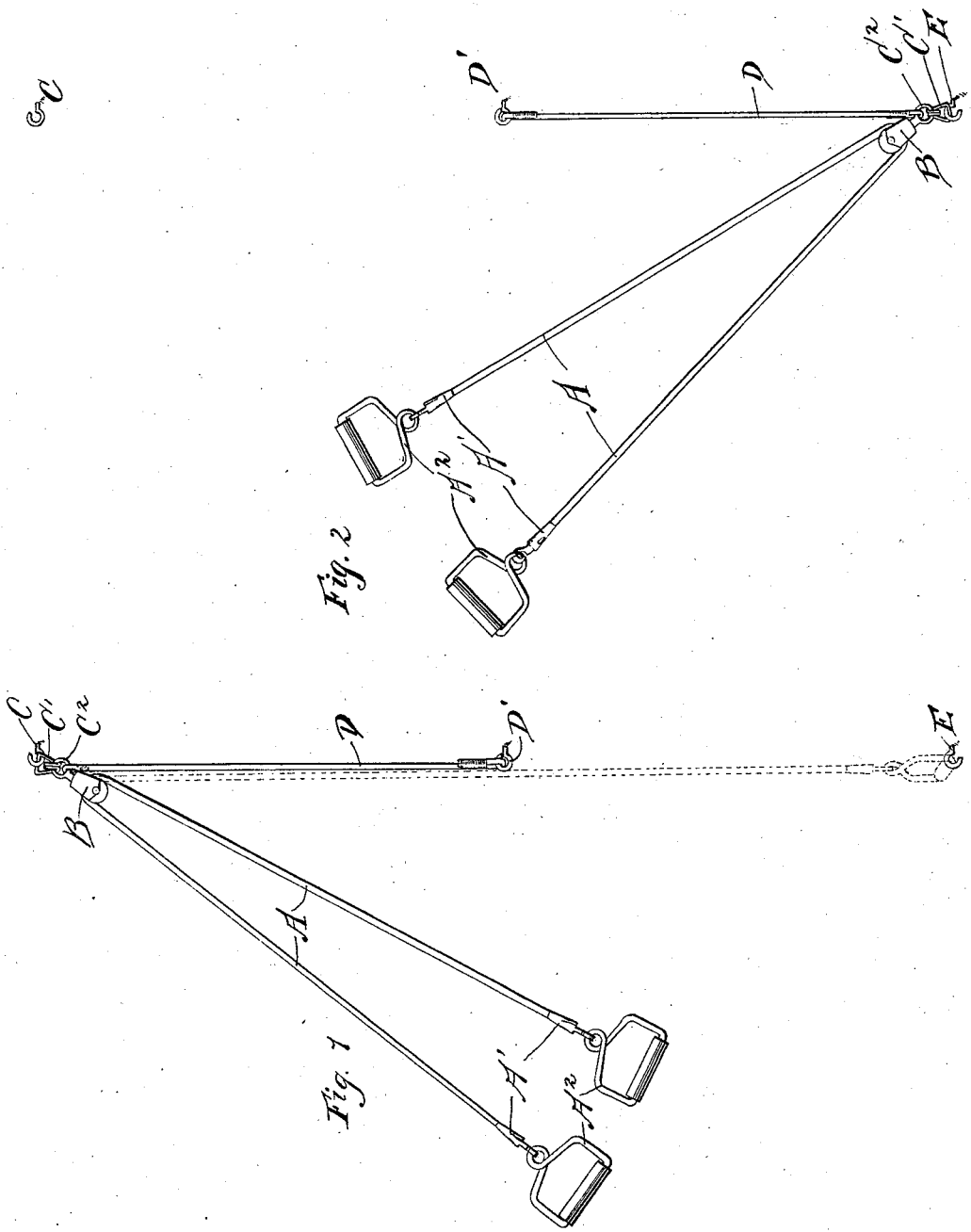
Witnesses.
D. M. Carter
Arthur E. Reinke
Inventor.
Alexander A. Whitely

UNITED STATES PATENT OFFICE.

ALEXANDER A. WHITELY, OF CHICAGO, ILLINOIS.

EXERCISING APPARATUS.

SPECIFICATION forming part of Letters Patent No. 557,176, dated March 31, 1896.

Application filed August 11, 1894. Renewed January 20, 1896. Serial No. 576,224. (No model.)

*To all whom it may concern:*

Be it known that I, ALEXANDER A. WHITELY, a citizen of the United States, and a resident of Chicago, in the county of Cook and State of Illinois, have invented a new and useful Improvement in Exercising-Machines, of which the following is a specification.

My invention relates to exercising-machines, and has for its object to produce a new and improved exercising device, of which the following is a description, reference being had to the accompanying drawings, wherein—

Figure 1 is a view of machine in position on the wall or other supporting device. Fig. 2 is a view of same in changed position.

Like letters refer to like parts throughout both figures.

An elastic cord A passes over the pulley B, which is supported by the hook C. As shown in the drawings, an intermediate hook C' passes through the eye $C^2$ of the pulley B and engages the hook C. Said intermediate hook C' is only used for convenience in changing the position of the machine from that shown in Fig. 1 to that shown in Fig. 2, and vice versa, and is no part of my invention, as any other mode of suspension may be employed when desired. The ends of the cord A are supplied with the hooks A' A', to which are attached the handles $A^2 A^2$, which are grasped by the operator in using the machine. A cord D has one end attached to the pulley B in any desirable manner, the other end being fastened to any device that may be attached to the wall—as, for example, the screw-eye D'. The cord D is preferably non-elastic. I may also do away with the pulley B and connect the cord A directly or indirectly to the hook C. A hook E is placed near the floor and supports the machine when in the position of Fig. 2. It is evident that the form and construction of these several parts may be varied without departing from the spirit of my invention, and I therefore do not wish to be limited to the exact construction shown.

The use and operation of my invention are as follows:

In using the machine the operator grasps the handles $A^2 A^2$ and extends the elastic cord A, and by going through a series of motions exercises the different muscles of the body. The resistance opposed to the muscles is regulated by varying the distance between the operator and the wall and thus varying the amount of extension in the cord at the beginning of the movement. It will be seen that this arrangement produces a very simple, cheap, and efficient device for exercising the muscles of the body, but a device which when used without the cord D may become exceedingly dangerous, for the direction of extension of cord A is in line with the body, and hence if the pulley B should become loosened from the hook C the sudden contraction of the elastic cord A would throw said pulley toward the operator with great force, and great injury, disfigurement for life, and even death might result. By the use of the cord D all such danger is obviated, for if the pulley B should come loose the cord D, being attached to it and to the wall, will arrest the motion of said pulley before it comes in contact with the operator.

The cord D is ready at all times to perform its function, for so long as the machine remains intact there is no strain or wear upon said cord or its connections, and hence no weakening of the parts.

It will be seen that I have here a simple, cheap, and efficient exercising-machine that may be used without danger to the operator.

To change the machine from the position of Fig. 1 to that of Fig. 2, the operator need only remove the hook C' from hook C and place it in position on the lower hook E.

The essence of this invention consists of the combination of the elastic cord or cords, as the case may be, with the anchoring rope or cord or the like, the whole arranged so that when in actual use the operator always stands at such a distance that if the elastic cord is released at the point of its engagement with the wall the pulleys and fastenings cannot strike the operator, because he will be standing at a greater distance than the length of the anchor-cord from the wall. The anchoring-cord is preferably non-elastic, but I have said substantially so, meaning to indicate thereby that the cord must be of much less elasticity than the exercising-cord, which is the real point of the claims in that regard. Where I say cord or cords, of course these words are practically interchangeable, as the elastic cord may be one-part or two-part.

Referring to the anchoring-cord, of course a short elastic cord could be used, but what I seek to convey by the term "substantially non-elastic" and the like is that the length and elasticity of the anchoring-cord compared with the length and elasticity of the exercising-cord should be such that when the attachment breaks loose the anchoring-cord will hold the parts and prevent them from swinging out far enough to strike the operator.

I claim—

1. In an exercising-machine, the combination of a substantially non-elastic anchoring-cord attached at one end to the wall, with an elastic exercising-cord, the two cords connected together and secured to the wall, the anchoring-cord being of a length less than the distance of the operator from the first point of its attachment to the wall, when the machine is in actual use.

2. In an exercising-machine, the combination of a substantially non-elastic anchoring-cord attached at one end to the wall, with an elastic exercising-cord, the two cords connected together and secured to the wall, the anchoring-cord being of a length less than the distance of the operator from the first point of its attachment to the wall, when the machine is in actual use, the exercising-cord provided with two handles, one at each end, and running over a pulley through which the cord is attached to the wall and the anchor-cord.

Signed the 8th day of August, 1894.

ALEXANDER A. WHITELY.

In presence of—
   DONALD M. CARTER,
   JEAN ELLIOTT.